US006236188B1

(12) United States Patent
Beckerman et al.

(10) Patent No.: US 6,236,188 B1
(45) Date of Patent: May 22, 2001

(54) MATRIX FOR BATTERY OPERATION OPTIMIZATION

(75) Inventors: Joel Beckerman, Canton; Robert John Melichar, Dearborn, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/687,517

(22) Filed: Oct. 13, 2000

(51) Int. Cl.$^7$ .......................... H01M 10/44; H01M 10/46
(52) U.S. Cl. .............................. 320/132; 324/426
(58) Field of Search .................... 320/127, 128, 320/132, DIG. 19, DIG. 21; 324/426, 427, 431, 433

(56) References Cited

U.S. PATENT DOCUMENTS 5,539,297 * 7/1996 Fiebig .
5,739,670 * 4/1998 Brost et al. .
5,808,445 9/1998 Aylor et al. .
5,895,440 4/1999 Proctor et al. .

* cited by examiner

*Primary Examiner*—Edward H. Tso
(74) *Attorney, Agent, or Firm*—Jennifer Stec

(57) ABSTRACT

A matrix system for a battery, which includes a first parameter of power usage and a first requirement, which designates a portion of the first parameter is disclosed. The system further includes a second parameter of temperature and a second requirement, which designates a portion of the second parameter. Also, a third parameter of state of charge and a third requirement, which designates a portion of the third parameter, is described. The portions of the first, second and third parameters intersect to form a volume.

14 Claims, 1 Drawing Sheet

MATRIX FOR BATTERY OPERATION OPTIMIZATION

TECHNICAL FIELD

The present invention relates generally to battery usage, and, more particularly, to efficient battery usage for maximizing battery life.

BACKGROUND

Batteries are commonly used in a wide array of applications such as automobiles, boats, motor homes, fork lifts, electronic wheelchairs, etc. The batteries used in such applications may, typically, be charged, discharged, and recharged again. In this manner, a single battery may serve as a source of electrical current for a relatively long period of time.

Although a battery may be charged and discharged many times, inefficient use of the battery can significantly shorten the life of the battery. In general, the service life of a battery is determined by the amount of capacity (ampere-hours) or energy (watt-hours) delivered by the battery. Thus, each battery has an expected lifetime that is limited to a given amount of energy or capacity in discharge. For large discharge applications, expected lifetime is a number of cycles of ampere-hours (or watt-hours). For shallow discharge applications, the capacity (or energy) is the quantification of dynamic and fluctuating cycling. One charge and discharge of a battery constitutes a single battery cycle. Thus, each battery has an expected lifetime that is limited to a given number of cycles. Improper battery cycling procedures can severely limit the life of a battery. Perhaps most importantly, discharging the battery to extremely low voltages can damage the battery and reduce the expected battery life. Additional factors such as temperature, storage period and discharge load may further reduce the expected battery lifetime. Over the last century, battery technology has experienced dramatic improvement, yet battery energy management remains an area characterized by uncertainty. In modern applications, where the remaining capacity is crucial (such as electric wheelchairs), battery users frequently overcharge, inefficiently cycle, and prematurely replace their batteries because accurate, affordable systems to find the optimal battery for a desired usage demand are unavailable. As battery systems become more complex, the penalty incurred by poor energy management increases.

The life and reliability (L&R) of a battery is generally quoted as the number of cycles or years. L&R is typically determined through laboratory analysis. The L&R of a battery is sensitive to the manner and temperature in which a battery is used. However, L&R assessment is not made in view of the conditions under which the battery will actually be used. Another difficulty encountered is that there is no efficient system to optimize, assess or design devices, which require batteries, based on the particular battery requirements.

The disadvantages associated with current, efficient, battery usage techniques have made it apparent that a new technique for optimizing battery use is needed. Given a particular device requiring a battery, the new technique should find a match for the device and the optimal battery for that device. The new technique should also apply life and reliability data to efficiently match the device and battery. The present invention is directed to these ends.

SUMMARY OF THE INVENTION

It is an object of the present invention to provide a system for more efficient usage of batteries which will extend or maximize battery life and evaluate batteries in the context of an application which is still under development. It is another object of the present invention to utilize operating parameters and application requirements to design and/or select a battery for the application. It is still further an object of the present invention to reconcile battery life and reliability parameters of power usage, temperature and state of charge with battery application requirements.

In accordance with the present invention, a matrix system for a battery is disclosed. The matrix system includes a first parameter of power usage and a first requirement, which designates a portion of the first parameter. The matrix system further includes a second parameter of temperature and a second requirement, which designates a portion of the second parameter. Also, a third parameter of state of charge and a third requirement, which designates a portion of the third parameter, is described. The portions of the first, second and third parameters intersect to form a volume. The matrix system is utilized to design and/or select the optimum battery and life for the particular application.

Additional advantages and features of the present invention will become apparent from the description that follows and may be realized by the instrumentalities and combinations particularly pointed out in the appended claims, taken in conjunction with the accompanying drawings.

BRIEF DESCRIPTION OF THE DRAWINGS

For a more complete understanding of the invention, there will now be described some embodiments thereof, given by way of example, reference being made to the accompanying drawings, in which.

DETAILED DESCRIPTION OF THE PREFERRED EMBODIMENT

The present invention is illustrated with respect to a matrix system 10, particularly suited to the electronics field. However, the present invention is applicable to various other uses that may require reconciliation of a component and a desired application, as will be understood by persons skilled in the art.

Figure 1:
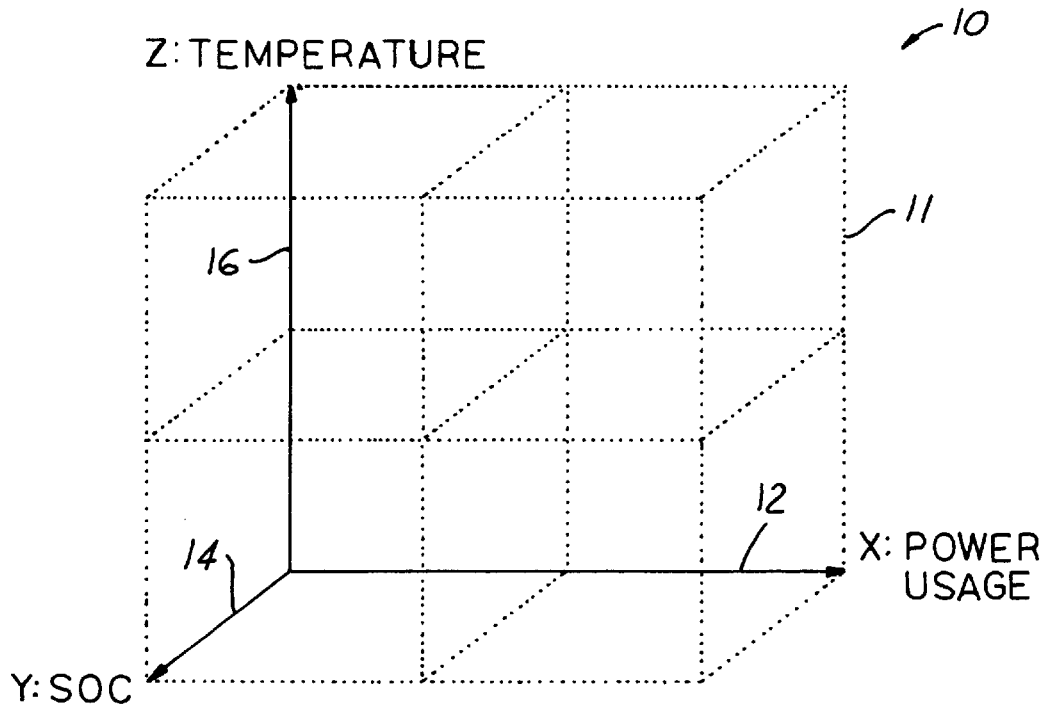
FIG. 1 is a perspective view of a matrix system in accordance with the present invention.

Referring to FIG. 1, a perspective view of a matrix system 10 for a battery application, in accordance with one embodiment of the present invention, is illustrated. The matrix system 10 includes a matrix 11 which is defined by a first parameter, ideally power usage, along the x-axis 12 of the matrix 11. The power usage is, for example, drive cycles for a range of amplitudes of the root-mean-squared current. The matrix system 10 is further defined by a second parameter, ideally battery state of charge (SOC), along the y-axis 14 of the matrix 11. The state of charge parameter is, for example, a range of bands in which the battery operates, which will be understood by one skilled in the art. A third parameter along the z-axis 16 of the matrix 11, ideally temperature, also defines a dimension of the matrix 11. The temperature is, for example, a range of temperature profiles from the air surrounding the battery (or the temperature under which the battery application will safely operate). Power usage, state of charge and temperature are crucial parameters for batteries. However, other parameters such as size or shape may also be used. Additionally, there may be almost any number of axis for a matrix like the demonstrated matrix 11 depending on the amount of parameters required for a given application.

Following the construction of the matrix 11, a volume in the matrix 11 is determined which will satisfy predetermined life and reliability requirements. The volume in the matrix 11 is defined by three requirements. The first requirement designates a portion of the first parameter, the second requirement designates a portion of the second parameter and the third requirement designates a portion of the third parameter. The volume in the matrix 11 is the intersection of the portions of the first, second and third parameters. The portions (which are essentially a set of ranges) for the volume used may be relatively large for robust system designs or relatively narrow for more delicate systems designs. A battery is defined by the volume within the matrix 11. However, the volume may also define an application requiring a battery as well.

After a battery is defined, a feedback controller for the matrix system determines, from a variety of known applications, which application or applications would be ideally suited for that particular battery. The controller operates by comparing the volume that the battery occupies in the matrix 11 and the volume that the application occupies in the matrix.

Figure 2:
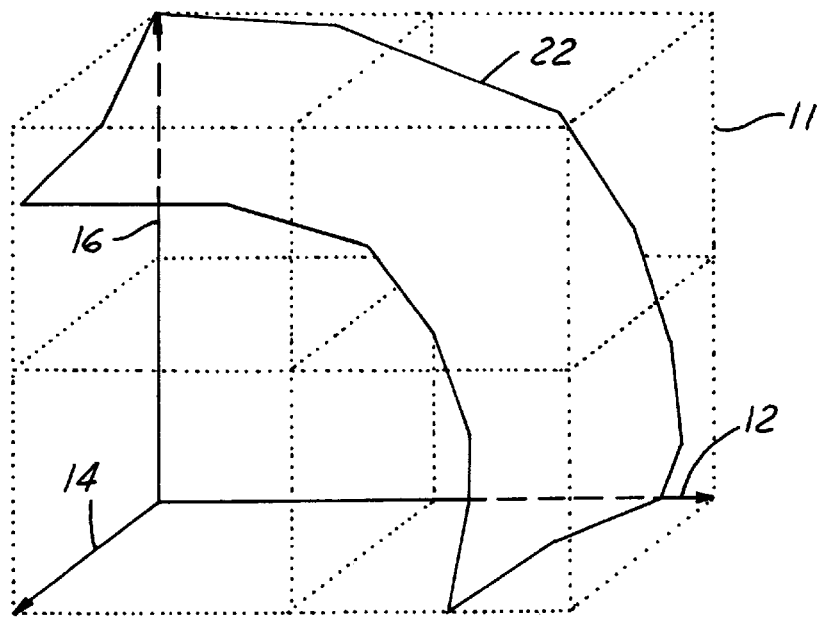
FIG. 2 is a perspective view of an example of a desired response for the matrix system, in accordance with one embodiment of the present invention.

Referring to FIG. 2, a perspective view of an example of a desired response for the matrix system 10 demonstrated in FIG. 1, is illustrated. The graph 22 in the matrix 11 is the volume that defines a given battery. This plot simplifies illustration of the power usage along the x-axis 12, state of charge along the y-axis 14 and temperature along the z-axis 16. Ideally, a given battery application will include a volume substantially within the volume 22 that substantially fills but does not exceed the volume 22 demonstrated in FIG. 2. The scaling of the axis is such that there is maximum resolution of the extent of the contained volume 22, which will be understood by one skilled in the art.

As a representative example of the matrix system 10 from FIG. 1, in operation, a vendor desires a battery within a power usage range of −10 kW to 10 kW, along the x-axis 12, a SOC range of 20% to 100%, along the y-axis 14, and a temperature range of −40 C. to 75 C., along the z-axis 16. This set of ranges define a volume similar to the graph 22, which will be understood by one skilled in the art. Subsequently, a battery volume is defined, for example, with ideal operating ranges of −8 kW to 8 kW for power usage, 20% to 100% for SOC, and −30 C. to 75 C. for temperature. The vendor volume and the battery volume are then compared for compatibility. If the vendor volume is not substantially similar to the battery volume, a second volume is created for a second battery and compared to the vendor volume. This process is continued for subsequent batteries until a battery with a substantially similar volume to the vendor volume is found.

From the foregoing, it can be seen that there has been brought to the art a new and improved matrix system 10 for battery applications. It is to be understood that the preceding description of the preferred embodiment is merely illustrative of some of the many specific embodiments that represent applications of the principles of the present invention. Numerous and other arrangements would be evident to those skilled in the art without departing from the scope of the invention as defined by the following claims:

What is claimed is:

1. A method for designing a battery application system having a power usage range, a temperature range, and a state of charge range, said method comprising the steps of:

constructing a matrix containing the power usage range, temperature range, and state of charge range;

designating a volume within said matrix, said volume defining battery application parameters; and reconciling said volume with an application; thereby designing the battery application model.

2. The method as recited in claim 1, wherein said step of designating includes the step of designating the power usage range necessary for operation of said application.

3. The method as recited in claim 1, wherein said step of designating includes the step of designating the temperature range necessary for operation of said application.

4. The method as recited in claim 1, wherein said step of designating includes the step of designating the state of charge range necessary for operation of said application.

5. A battery application system comprising:

a matrix having a first parameter, a second parameter, and a third parameter;

a first requirement designating a portion of said first parameter;

a second requirement designating a portion of said second parameter;

a third requirement designating a portion of said third parameter; such that a volume is formed within said matrix at an intersection of said portions of said first, second and third parameters;

a battery defined by said volume within said matrix;

a first application for said battery; and a controller, wherein said controller determines whether said first application is substantially defined by said volume.

6. The system as recited in claim 5, wherein said parameters are scaled such that resolution of said volume is substantially maximized.

7. The system as recited in claim 5, further comprising a second application, wherein said controller determines whether said second application is substantially defined by said volume.

8. The system as recited in claim 5, wherein said first application is a vehicle.

9. The system as recited in claim 5, wherein said first parameter is battery power usage.

10. The system as recited in claim 5, wherein said second parameter is temperature.

11. The system as recited in claim 5, wherein said third parameter is state of charge.

12. A matrix system for a battery comprising:

a first parameter of power usage;

a first requirement designating a portion of said first parameter;

a second parameter of temperature;

a second requirement designating a portion of said second parameter;

a third parameter of state of charge; and a third requirement designating a portion of said third parameter, such that said portions of said first, second and third parameters intersect to form a volume.

13. The system as recited in claim 12, wherein a battery is defined by said volume.

14. The system as recited in claim 12, wherein a battery application is defined by said volume.

* * * * *